(12) United States Patent
Ng et al.

(10) Patent No.: US 9,310,934 B2
(45) Date of Patent: Apr. 12, 2016

(54) SYSTEMS AND METHODS OF MOISTURE DETECTION AND FALSE TOUCH REJECTION ON TOUCH SCREEN DEVICES

(71) Applicant: QUALCOMM Incorporated, San Diego, CA (US)

(72) Inventors: Teresa Ka Ki Ng, San Diego, CA (US); William Yee-Ming Huang, Vista, CA (US); Qiang Gao, San Diego, CA (US); Hsun Wei David Wong, San Diego, CA (US); Carol King Mui Law, San Diego, CA (US); Raghukul Tilak, San Diego, CA (US); Rex Wang, San Diego, CA (US); Suhail Jalil, Poway, CA (US); Mohamed Imtiaz Ahmed, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/540,940

(22) Filed: Nov. 13, 2014

(65) Prior Publication Data

US 2015/0242051 A1     Aug. 27, 2015

Related U.S. Application Data

(60) Provisional application No. 61/943,209, filed on Feb. 21, 2014.

(51) Int. Cl.
  *G06F 3/045*   (2006.01)
  *G06F 3/041*   (2006.01)
  *G06F 3/044*   (2006.01)

(52) U.S. Cl.
  CPC .............. *G06F 3/0418* (2013.01); *G06F 3/044* (2013.01); *G06F 2203/04101* (2013.01)

(58) Field of Classification Search
  CPC ....... G06F 3/041; G06F 3/0418; G06F 3/044; G06F 3/047; G06F 2203/04101; G06F 2203/04108
  See application file for complete search history.

(56) References Cited

U.S. PATENT DOCUMENTS

| | | | |
|---|---|---|---|
| 6,730,863 B1 * | 5/2004 | Gerpheide | G06F 3/044 178/18.02 |
| 8,717,331 B2 | 5/2014 | Kremin et al. | |
| 8,773,146 B1 * | 7/2014 | Hills | G01N 27/22 324/658 |
| 2011/0084928 A1 * | 4/2011 | Chang | G01R 27/2605 345/173 |
| 2012/0146924 A1 * | 6/2012 | Inoue | G06F 3/0418 345/173 |
| 2012/0293447 A1 | 11/2012 | Heng et al. | |
| 2013/0176268 A1 | 7/2013 | Li et al. | |
| 2013/0207935 A1 * | 8/2013 | Toda | G06F 3/044 345/174 |
| 2013/0234987 A1 * | 9/2013 | Ye | G06F 3/044 345/174 |

(Continued)

FOREIGN PATENT DOCUMENTS

EP     2500802 A1    9/2012
EP     2631744 A1    8/2013

OTHER PUBLICATIONS

International Search Report and Written Opinion—PCT/US2015/016372—ISA/EPO—May 7, 2015.

*Primary Examiner* — Joe H Cheng
(74) *Attorney, Agent, or Firm* — Knobbe, Martens, Olson & Bear LLP

(57) ABSTRACT

The presence of moisture on a touch screen device can mimic a user's touch causing false input detection and recognition. Disclosed are systems and methods for detecting the presence of moisture on a touch screen device.

30 Claims, 15 Drawing Sheets

(56) References Cited

U.S. PATENT DOCUMENTS

| | | | |
|---|---|---|---|
| 2014/0022207 A1* | 1/2014 | Shimizu | G06F 3/044 345/174 |
| 2014/0062950 A1 | 3/2014 | Chang et al. | |
| 2014/0092033 A1 | 4/2014 | Chang et al. | |
| 2014/0104207 A1* | 4/2014 | Park | G06F 3/041 345/173 |
| 2015/0077394 A1* | 3/2015 | Dai | G06F 3/044 345/174 |

* cited by examiner

SYSTEMS AND METHODS OF MOISTURE DETECTION AND FALSE TOUCH REJECTION ON TOUCH SCREEN DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 61/943,209, filed Feb. 21, 2014, entitled "METHOD OF MOISTURE DETECTION AND FALSE TOUCH REJECTION ON TOUCH DEVICES," the entire content of which is hereby incorporated by reference herein in its entirety and should be considered a part of this application.

BACKGROUND

1. Field

The present application relates generally to touch screen devices, and more specifically to systems, methods, and devices for moisture detection and false touch rejection on touch screen devices.

2. Description of the Related Art

Moisture (e.g., sweat, spilled water, condensation, or any visible moisture) on a touch screen device can mimic the characteristics of an intended touch input generated by fingers, styluses, and/or other touch input mechanisms. As a result, moisture can cause false detections, inaccurate input recognitions, and/or errors, which can be problematic for a user. For example, a false detection due to moisture could cause a smartphone to prematurely send an incomplete email or text, or otherwise not perform as expected and/or as desired.

The issue behind this problem is that a touch screen device detects valid touches by processing changes in touch signals (e.g., electrical signals) on the touch screen. In some cases, moisture can cause a similar change to these touch signals as intended touch inputs.

There have been a number of previous attempts to address this issue. Some of these attempts have tried to use a threshold, where the touch screen device treats smaller touch signals below the threshold as false touches. The issue with this approach is that it will either not detect certain intended touch inputs that produce weaker signals, such as touches using a stylus, or will be slow to adapt to the presence of moisture and still have false detections.

Other attempts have looked at the persistence of changed signals to detect moisture or other unwanted matter on a touch screen. These attempts are slow to identify moisture and might recognize moisture after it is too late and false detections have already occurred.

Still other attempts have looked at clusters of values to see if the clusters fall below some threshold. These techniques do not account for the erratic behavior of touch signal changes due to moisture, and that the presence of moisture can cause spikes in touch signals above the threshold.

Accordingly, because of the shortcomings of the previous attempts, there is a need for more effective systems and methods for detecting the presence of moisture on touch screens of touch screen devices and for rejecting false detections due to the presence of moisture.

SUMMARY

Some touch screen devices detect touches by measuring touch signals (e.g., electrical signals) from sensing nodes on the touch screen. In some cases, moisture (e.g., sweat, spilled water, condensation, or any visible moisture) on the touch screen device can cause the touch signals from the sensing nodes on the touch screen to mimic the characteristics of intended touch inputs (e.g., touches by fingers or styluses), causing false detections and/or errors. The present application relates to systems and methods for moisture detection and false touch rejection on touch screen devices.

Accordingly, one aspect relates to a touch screen apparatus, comprising: a touch screen having a plurality of sensing nodes, each sensing node being configured to sense a screen touch event and produce a corresponding touch signal; a sensing circuit configured to receive touch signals from the plurality of sensing nodes and to produce a screen signal comprising each location of each sensing node and a corresponding value representative of the received touch signal at each location of each sensing node; a memory component in communication with the sensing circuit, the memory component configured to store screen signal information; and a processor in communication with the memory component. The processor is configured to: retrieve screen signal information from the memory component; determine if the screen signal information includes one or more sensing node locations with corresponding values indicative of a first local maximum value having a value less than a first threshold value and greater than a second threshold value; determine if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region; and determine that moisture is in contact with the touch screen at the one or more sensing node locations with corresponding values indicative of a first local maximum based on at least the inclusion of the first sensing node location.

Another aspect relates to a moisture detection method, comprising: receiving touch signals from a plurality of sensing nodes of a touch screen, each sensing node being configured to sense a screen touch event and produce a corresponding touch signal; producing screen signal information comprising each location of each sensing node and a corresponding value representative of the received touch signal at each location of each sensing node; determining if the screen signal information includes one or more sensing node locations with corresponding values indicative of a first local maximum value having a value less than a first threshold value and greater than a second threshold value; determining if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region; and determining that moisture is in contact with the touch screen at the one or more sensing node locations with corresponding values indicative of a first local maximum based on at least the inclusion of the first sensing node location.

Another aspect relates to a touch screen apparatus, comprising: means for receiving touch signals from a plurality of sensing nodes of a touch screen, each sensing node being configured to sense a screen touch event and produce a corresponding touch signal; means for producing screen signal information comprising each location of each sensing node and a corresponding value representative of the received signal at each location of each sensing node; means for determining if the screen signal information includes one or more sensing node locations with corresponding values indicative of a first local maximum value having a value less than a first threshold value and greater than a second threshold value; means for determining if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region; and means for determining that moisture is in contact with the touch screen at the one or more sensing node locations with corresponding values indicative of a first local maximum based on at least the inclusion of the first sensing node location.

Another aspect relates to a moisture detection method, comprising: receiving touch signals from a plurality of sensing nodes of a touch screen, each sensing node being configured to sense a screen touch event and produce a corresponding signal; producing screen signal information comprising each location of each sensing node and a corresponding value representative of the received signal at each location of each sensing node; determining if the screen signal information includes one or more sensing node locations with corresponding values indicative of local maxima values having a value less than a first threshold value and greater than a second threshold value; and determining that moisture is in contact with the touch screen based on at least a comparison between the one or more sensing node locations with corresponding values indicative of local maxima values and one or more three-dimensional shapes.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting. The scope of the disclosure is defined by the appended claims and equivalents thereof.

Figure 1:
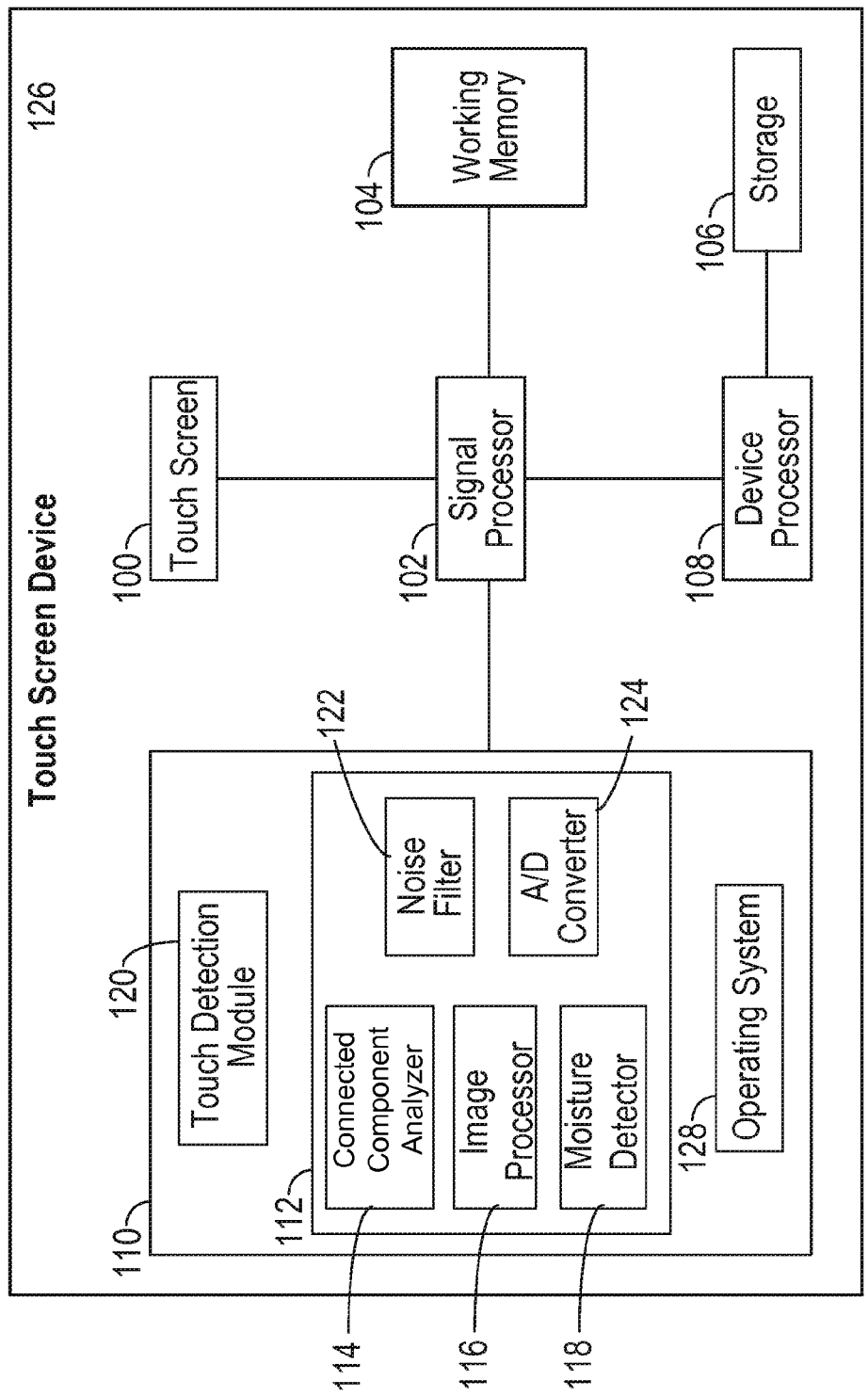
FIG. 1 is a functional block diagram of an example touch screen device.

FIG. 1 is a functional block diagram of an example touch screen device. Some examples of touch screen devices are a smart phone, tablet computer, and other mobile devices. The touch screen device 126 includes a touch screen 100 that is connected to a signal processor 102. The signal processor 102 controls the various operations that analyze the touch signals (e.g., electrical signals), screen signals (e.g., an aggregation of touch signals), and/or data outputted by the touch screen 100. The signal processor 102 is in communication with device processor 108, which is in communication with storage component 106.

In addition, signal processor 102 may be coupled with working memory 104, which may include both read-only memory (ROM) and random access memory (RAM), and may provide instructions and data to the signal processor 102. A portion of the working memory 104 may also include non-volatile random access memory (NVRAM). The signal processor 102 typically performs logical and arithmetic operations based on program instructions stored within the working memory 104. The instructions in the working memory 104 may be executable to implement the methods described herein. Module components in component 110 may be coupled to the signal processor 102 to perform operations such as signal amplification, noise filtering, compression, etc. For example, module component 120 is a touch detection module that may be used to detect finger touches and/or any other sort of touch on the touch screen 100 (e.g., stylus touch inputs). Module components in component 112 may be used for signal processing. Module component 114 is an example connected component analyzer that can locate and analyze sets of connected components in a screen signal. Module component 116 is an example image processor, which may use image processing techniques on screen signals. Module component 118 is an example moisture detector that would detect moisture on touch screen 100 based on screen signals from touch screen 100. Module component 122 is an example noise filter, which may be used to remove noise from screen signals. Module component 124 is an A/D converter, which may be used to convert a screen signal received by the signal processor 102 from an analog signal to a digital signal. Module component 128 is an example operating system, which may configure the signal processor 102 to manage the working memory 104 and the processing resources of touch screen device 126. For example, module component 128 may include device drivers to manage hardware resources for example touch screen 100. Module component 128 may further configure the signal processor 102 to share information with device processor 108.

A person having ordinary skill in the art would appreciate that there are various implementations of touch screen technology. These different types of touch screens have different ways of detecting the presence of a touch. For example, two common methods are self capacitance and mutual capacitance. Touch screen devices may also vary in the precise way they organize sensors, where some touch screen devices, for example, might use a diamond configuration and others might use a square configuration. The present application is not limited to any particular types of touch screen devices. The following examples of touch screen technology are meant only to illustrate the elements of the present application.

Figure 2:
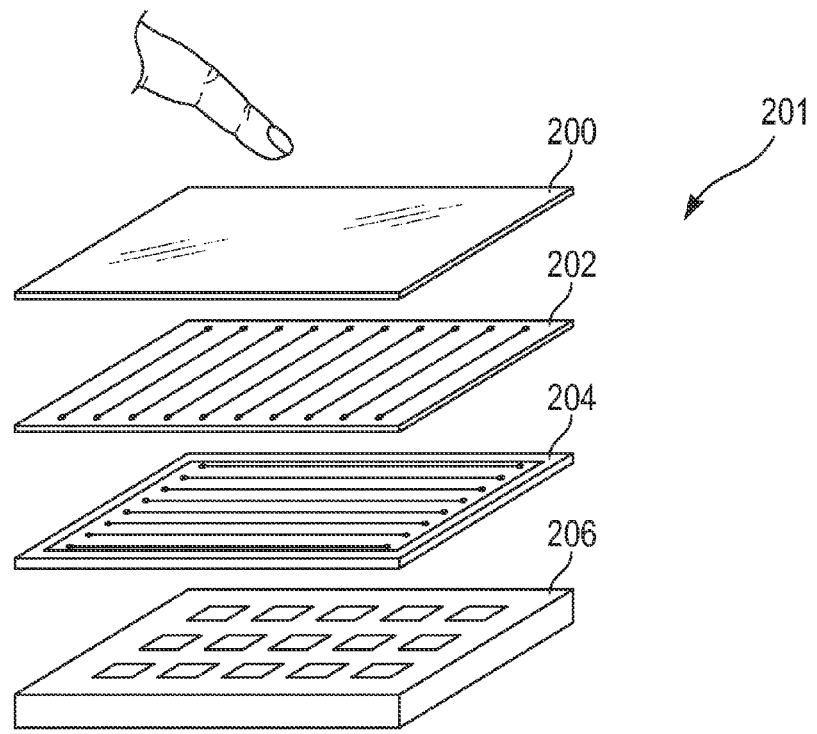
FIG. 2 is an example breakdown of the different constructional layers in an example touch screen device.

FIG. 2 is an example breakdown of the different constructional layers in an example touch screen device. This example shows the various layers that could make up the touch screen device 201. Top layer 200 is an overlay. It could be made of glass, plastic, or other materials. Driving layer 202 contains driving lines, which may carry current. Sensing layer 204 contains sensing lines, which may detect current. Notably, the driving lines of driving layer 202 and the sensing lines of sensing layer 204 intersect each other to form a grid. Display layer 206 produces the image seen on the touch screen. In some cases, display layer 206 may present selectable options.

Having a driving layer 202 and sensing layer 204 as separate layers is an example of mutual capacitance technology. However, a person having ordinary skill in the art would recognize that there are many other known ways for a touch screen device to be constructed, including combining one or more of the aforementioned layers in FIG. 2 into a single layer. The embodiments of this disclosure are not limited to any particular way of constructing the touch screen device.

Figure 3:
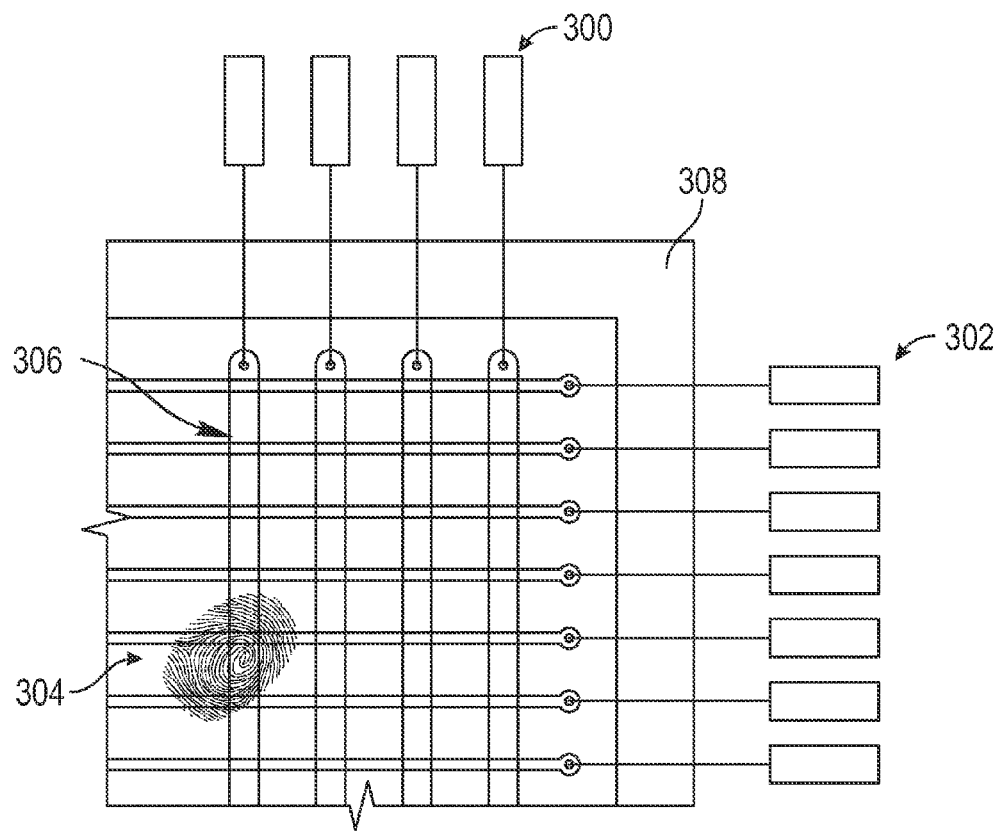
FIG. 3 illustrates an example of circuitry that detects a touch on a touch screen device.

FIG. 3 illustrates an example of circuitry that detects a touch on a touch screen device. Touch screen device 308 has driving lines, such as driving line 300, and sensing lines, such as sensing line 302. These driving and sensing lines intersect or overlap to form sensing nodes, such as sensing node 306. A touch on the screen, such as finger touch 304, is detected relative to the grid formed by the intersection or overlap of driving lines and sensing lines. This grid allows the touch screen device 308 to locate a touch at a location on the screen by pinpointing the touch relative to intersections or overlaps of the driving lines and sensing lines. Accordingly, the grid allows touch screen device 308 to locate the location of finger touch 304.

Figure 4B:
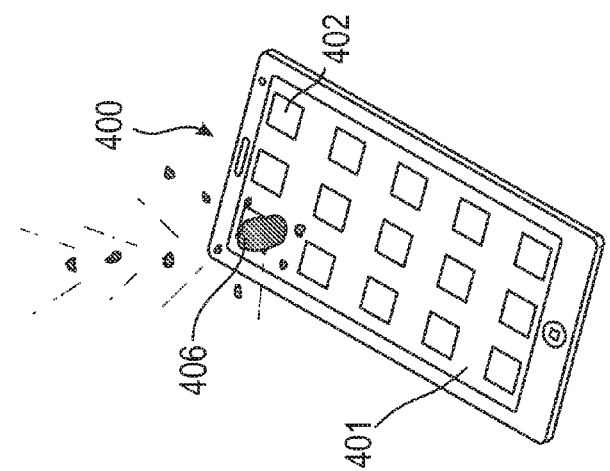
FIG. 4B illustrates an example where moisture causes a false touch input recognition.
Figure 4A:
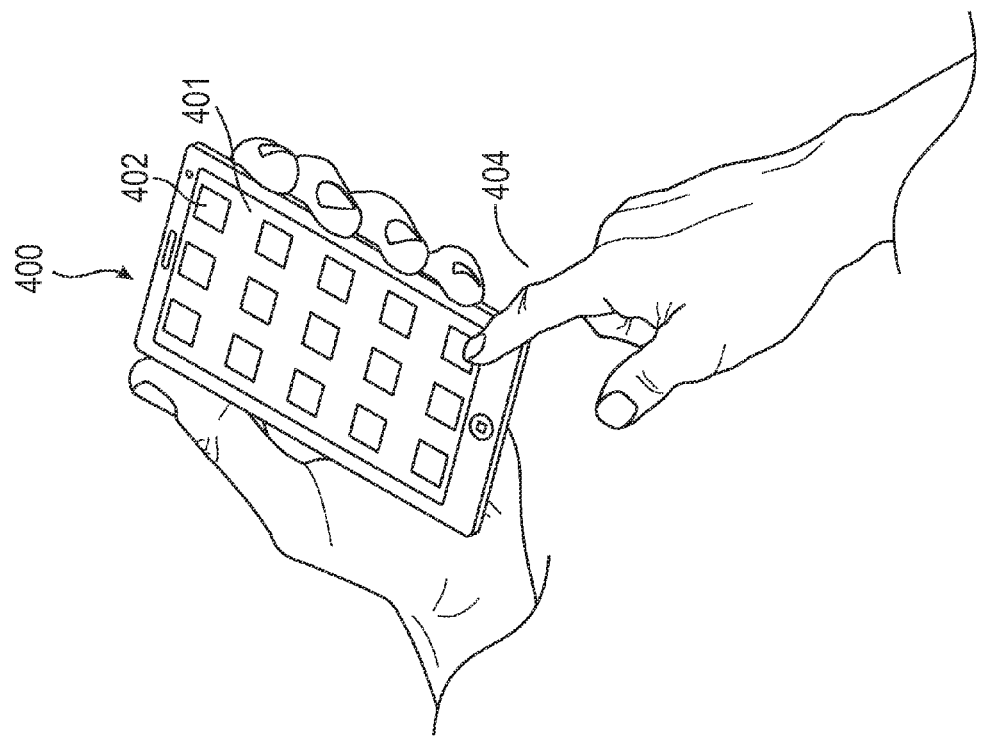
FIG. 4A illustrates an example where a touch input caused by a finger is detected.

FIG. 4A illustrates an example where a touch input caused by a finger is detected. In this example, touch device screen 400 has one or more selectable options 402 (e.g., icons) displayed on the screen 401. As shown, the user can select those selectable options 402 using finger 404.

FIG. 4B illustrates an example where moisture causes a false touch input recognition. In this example, moisture 406 (e.g., sweat, spilled water, condensation, and/or any visible moisture) residing on the screen 401 of the touch screen device 400 can be detected as a touch input (e.g., a selection of one or more selectable options 402) and cause the touch screen device 400 to falsely detect that an intended touch has occurred.

Figure 5A:
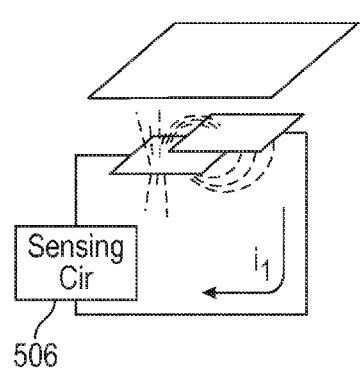
FIGS. 5A, 5B, and 5C illustrate examples of what occurs when a touch screen device contacts no touch, a finger touch, and a moisture drop touch.
Figure 5B:
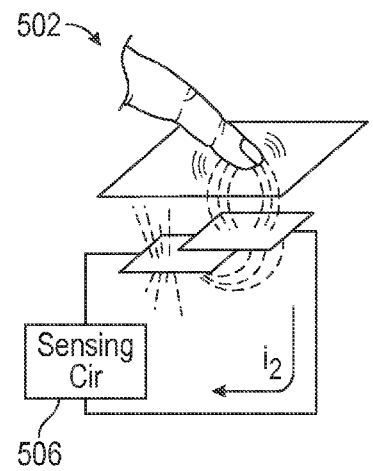
Figure 5C:
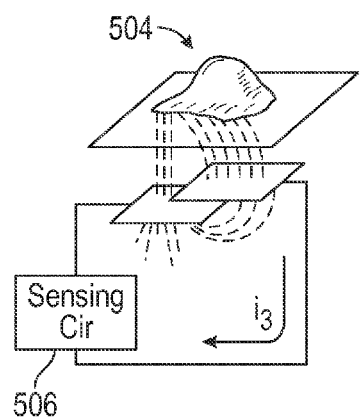

FIGS. 5A, 5B, and 5C illustrate examples of what occurs when a touch screen device contacts no touch, a finger touch, and a moisture drop touch. These are a few examples of touch screen events, which may include finger touches, moisture drop touches, stylus touches, and/or any interaction or lack of interaction with a touch screen. A touch screen event of no touch, a finger touch, and/or a moisture drop touch can be detected at a sensing node by measuring the changes in the capacitance between the driving and sensing lines associated with the sensing node. FIG. 5A shows the case with no touch or foreign matter on the screen. A sensing circuit 506 can measure a current $i_1$. Essentially, the current $i_1$ is indicative of electrical noise because no touch or foreign matter has been introduced to the screen. As shown in FIG. 5B, in response to a touch by finger 502, the capacitance between the driving and sensing lines changes, and a different current $i_2$ flows to the sensing circuit 506. Similarly, FIG. 5C illustrates that in the case of moisture drop 504, the capacitance between the driving and sensing lines also changes. In that case, the current to the sensing circuit 506 is a different current, current $i_3$. In any case, the sensing circuit 506 reads the current (or voltage), and in turn outputs on a dataline touch signals (e.g., electrical signals) proportional to its readings.

Figure 6:
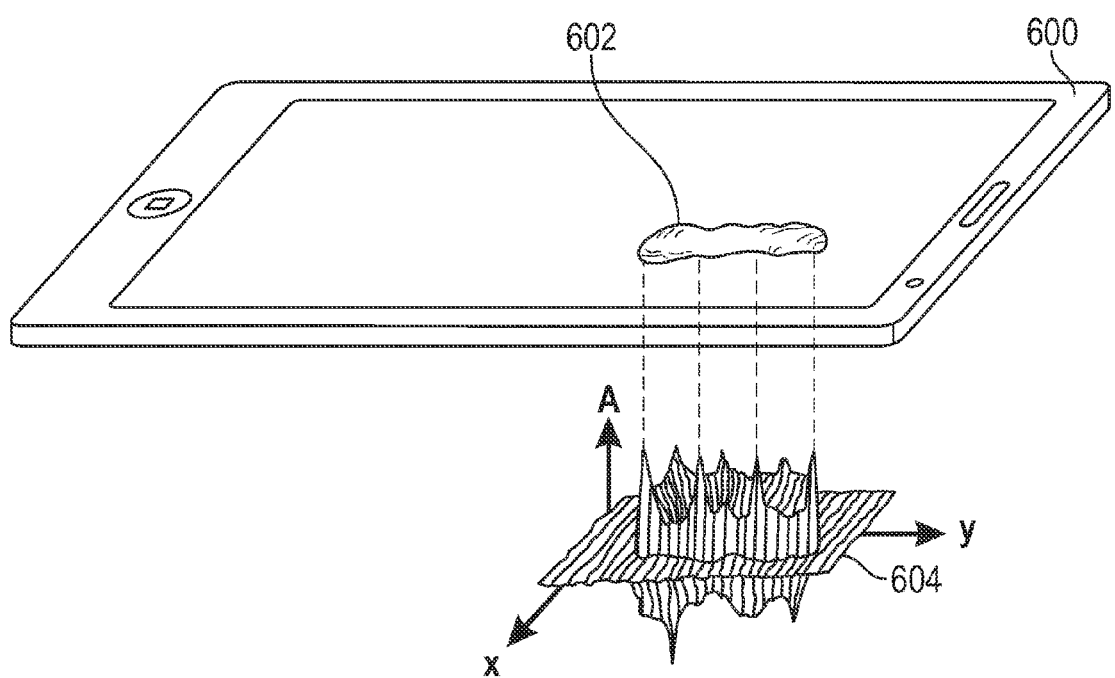
FIG. 6 illustrates an example screen signal when moisture is on a touch screen.

FIG. 6 illustrates an example screen signal when moisture is on a screen. As used herein, a screen signal is an aggregation of the touch signals read at each of the sensing circuits for a portion of a touch screen or an entire touch screen. Thus, the screen signal 604 visually depicted in FIG. 6 represents the aggregation of touch signals read at each of the sensing circuits of sensing nodes in contact with moisture drop 602 on touch screen device 600. It should be noted that each sensing node on the touch screen device 600 has a respective touch signal, and these touch signals can be utilized to create a larger screen signal including the touch signals read at some or all of the sensing nodes of the screen.

Screen signal 604 can be visualized in three dimensions. The first two dimensions, x and y, reflect the location of a touch signal on touch screen device 600. The units of these axes indicate sensing nodes, pixels, and/or any metric of screen size (e.g., millimeters). The third dimension, A, represents the amplitude of a touch signal measured by a sensing circuit at a sensing node. This measurement is dependent on the current flow on the circuit to which the sensing node is connected, which in turn is dependent on the capacitance due to, for example, a finger touch, moisture drop touch, or electrical noise. A screen signal such as screen signal 604 also changes over time due to, for example, changes in a touch input, the addition or loss of moisture, or fluctuations in electrical noise.

Figure 7A:
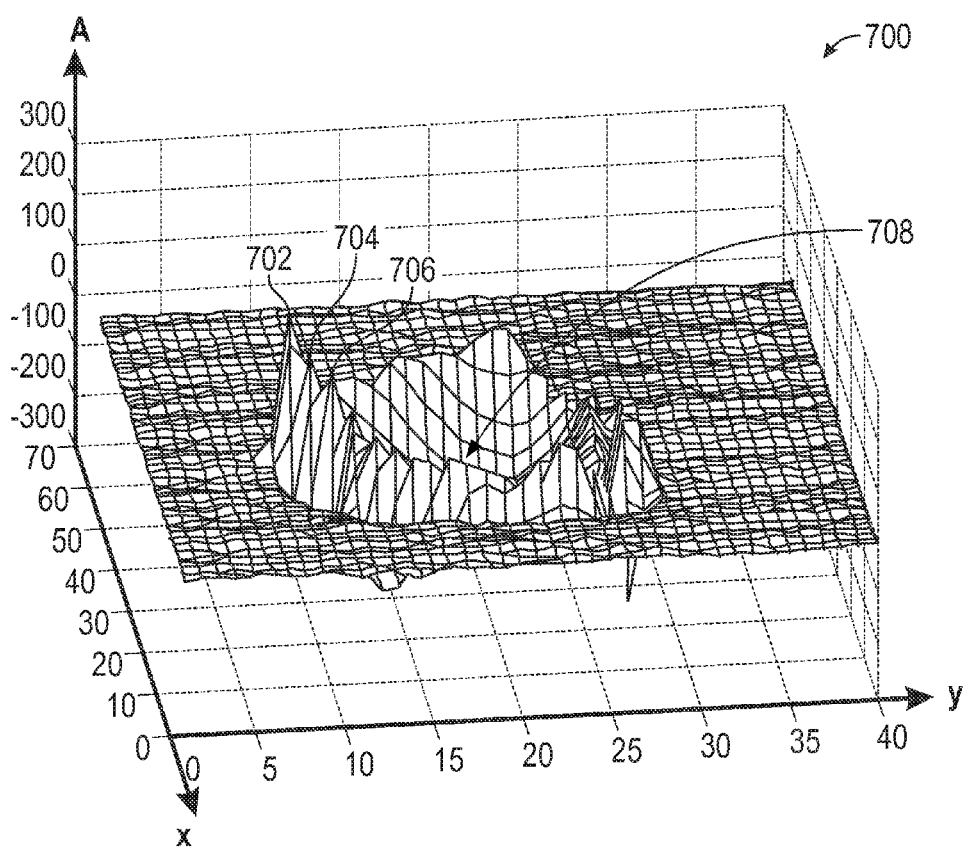
FIG. 7A is an example of a top-view of a graph of a screen signal generated from a moisture drop touch in an instance of time.

FIG. 7A is an example of a top-view of a graph of a screen signal generated from a moisture drop touch in an instance of time. This figure exhibits one way a screen signal may be visualized. Again, the screen signal 700 is an aggregate of the touch signals read at each of the sensing circuits of each of the sensing nodes in a touch screen device, such as touch screen device 600 from FIG. 6. Also again, the first two dimensions, x and y, reflect the location of the signal on the touch screen. The units of these axes indicate sensing nodes, pixels, and/or any metric of screen size (e.g., millimeters). The third dimension, A, represents the amplitude of a touch signal measured by a sensing circuit at a sensing node. The lines between the touch signals are for visualization purposes. They may also be interpolated in some embodiments. A person having ordinary skill in the art would appreciate that a screen signal such as screen signal 700 may be manipulated by elementary signal processing techniques in order to simplify calculations. For example, screen signal 700 has been adjusted to remove a DC offset and the polarity of the screen signal has been set such that a finger touch exhibits a positive screen signal (instead of a negative). Other elementary signal processing techniques may involve noise filtering, baselining, analog-to-digital conversion, amplification, or compression. A person having ordinary skill in the art would recognize that the techniques of this disclosure are readily adaptable to be compatible with any signal processing techniques used to manipulate a screen signal and/or any type of signal known in the art.

As shown, screen signal 700 consists of touch signals with various amplitudes. For example, screen signal 700 has various local maxima, which are touch signals of the screen signal 700 having amplitudes greater than the amplitudes of touch signals corresponding to all spatially adjacent sensing nodes. Some examples of local maxima are touch signals 702, 704, and 706. Any local maximum in screen signal 700 is not necessarily a global maximum, which would be the touch signal with the greatest amplitude in the entire screen signal 700. Screen signal 700 also has dip region 708 in the middle. Such a dip region surrounded by heightened touch signals is characteristic of screen signals associated with moisture in this polarity. The dip region 708 itself has touch signals of various amplitudes.

Figure 7B:
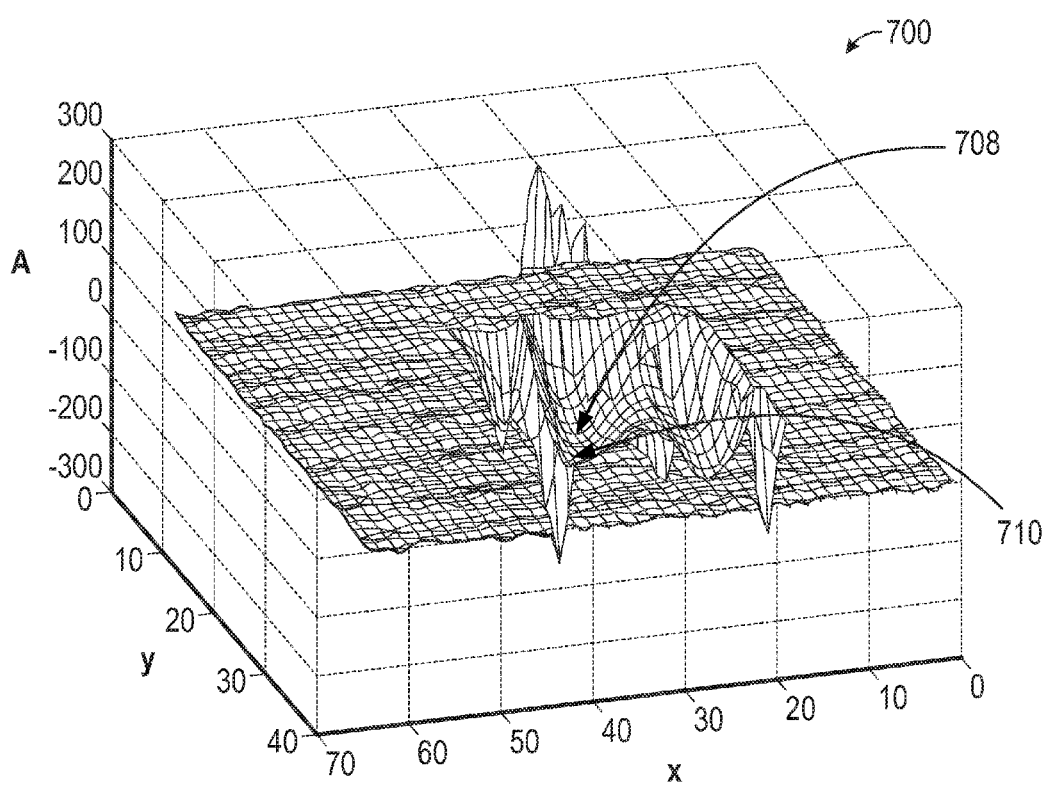
FIG. 7B is an example of a bottom-view of a graph of a screen signal generated from the same moisture drop touch as in FIG. 7A in the same instance of time.

FIG. 7B is an example of a bottom-view of a graph of a screen signal generated from the same moisture drop touch as in FIG. 7A in the same instance of time. From this view, one can see touch signals of various amplitudes within the dip region 708. For example, touch signal 710 has an amplitude less than the amplitudes of spatially adjacent touch signals.

Figure 8:
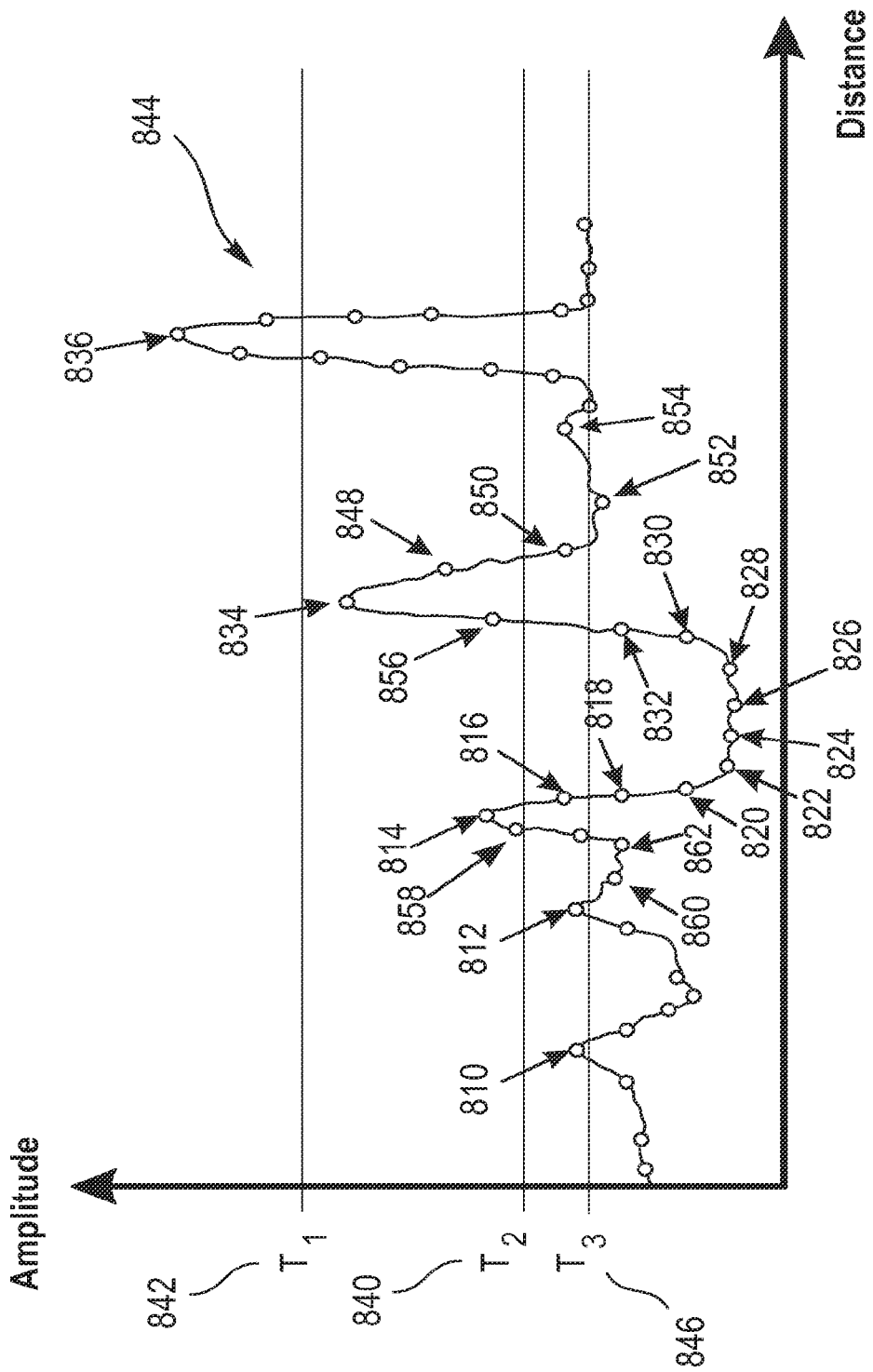
FIG. 8 is an example graph of a screen signal over a distance where moisture exists.

For illustrative purposes, FIG. 8 is an example graph of a screen signal over a distance where moisture exists. In some instances, it may be a two-dimensional slice or cross-section taken from a three-dimensional screen signal, such as screen signal 700 shown in FIGS. 7A and 7B. The slice is representative of a portion of the screen signal viewed from a plane orthogonal to both the x and y planes. Accordingly, in the graph of a screen signal 844, each sensing node is plotted by its distance location against the amplitude of the touch signal measured at that sensing node.

The graph of screen signal 844 has local maxima in this plane, shown as touch signals 810, 812, 814, 834, and 836. Again, these touch signals have amplitudes greater than the amplitudes of all touch signals spatially adjacent to them (e.g., touch signals measured at neighboring sensing nodes) in this plane. Note, in contrast, any given touch signal analyzed in three dimensions would have more spatially adjacent touch signals because sensing nodes (from which touch signals are measured) can be spatially adjacent in more planes in three dimensions.

In some embodiments, the amplitudes of the touch signals are compared to two threshold amplitudes to determine the nature of the touch producing those touch signals. These threshold amplitudes can be static values stored in memory, or values dynamically calculated through formulas dependent on any combination of measured or stored signals, such as touch signals, noise signals, or other reference signals.

In general, the amplitudes of touch signals (positive and/or negative, depending on the polarity of the signal) measured at sensing nodes when there is a touch by a finger on the touch screen device are greater than the touch signal amplitudes measured at sensing nodes that are touched by other objects (e.g., styluses or moisture drops) or not touched at all. As a result, touch signals that have amplitudes over a certain amplitude are clearly associated with finger touches instead of some other touch event.

For the graph of screen signal 844, where the polarity associates finger touches with touch signals of positive amplitudes, a finger touch threshold $T_1$ 842 represents a threshold amplitude above which all touch signals are associated with finger touches. A noise threshold $T_2$ 840 represents a threshold amplitude below which touch signals are not associated with intended input touches. In other words, the touch signals with amplitudes below the noise threshold $T_2$ 840 are associated with noise.

The graph of screen signal 844 also utilizes a third threshold used to identify dip regions, which may be used for identifying moisture. For example, a dip threshold $T_3$ 846 would be an amplitude below which touch signals may be part of a dip region. Dip threshold $T_3$ 846 could be a static value stored in memory or dynamically calculated. In some embodiments, it may also be equal to the noise threshold $T_2$ 840.

It should also be noted that one of ordinary skill in the art would recognize that the use of thresholds in this disclosure may also be interchanged with offsetting a screen signal, wherein touch signals below a threshold may have negative amplitudes in some polarities.

Between the finger touch threshold $T_1$ 842 and noise threshold $T_2$ 840 is a range of amplitudes in which touch signals cannot be clearly identified as associated with either a finger touch or noise. Some of the touch signals with these amplitudes may be generated by weak touches, touches by styluses, or touches by moisture. The present disclosure distinguishes which of these touch signals are generated by moisture.

In some embodiments, moisture is detected by looking for certain screen signal characteristics that are indicative of moisture. The shape of the screen signals associated with moisture are higher around the edges and have dip regions within those edges. The touch signals of the higher edges have amplitudes falling between the finger touch threshold and the noise threshold, and the touch signals of the dip region within those edges have amplitudes falling below a dip threshold. As such, screen signals associated with moisture form an approximate ring, torus, donut and/or bowl shape. The screen signals may also form any shape where the sides are raised and the middle is a dip region.

With continued reference to FIG. 8, in the graph of screen signal 844, touch signals 814 and 834 are local maxima not more than the finger touch threshold $T_1$ 842 and not less than noise threshold $T_2$ 840. Disposed between the touch signals 814 and 834 is a dip region with touch signals 818, 820, 822, 824, 826, 828, 830, and 832 that are below dip threshold $T_3$ 846. The shape formed by these touch signals is one that may be detected as moisture in some embodiments. It should be noted that some embodiments of moisture detection disclosed herein may be performed in two dimensions and/or three dimensions. Three-dimensional analyses may be more robust in some instances. For example a local maximum found in a two-dimensional slice might not be a local maximum in three dimensions. Also, there may be false detections in two dimensions where detected moisture is actually part of a finger touch signal. However, the two-dimensional approach may be in some cases faster and require fewer computations. In some instances, a combination of two-dimensional and three-dimensional approaches may be used. In certain embodiments, other dimensions can be included in the analysis as well, such as time. For example, analyses may look at how two-dimensional or three-dimensional representations of the touch signals measured at sensing nodes change over time.

In some embodiments, two-dimensional analysis may be performed on a two-dimensional slice such as the graph of a screen signal 844 illustrated in FIG. 8. In these embodiments, moisture may be identified by one or more local maxima in proximity with strings of touch signals below dip threshold $T_3$ 846. For example, the string of touch signals 818, 820, 822, 824, 826, 828, 830, and 832 would be a string of touch signals below dip threshold $T_3$ 846. On the other hand, the string of touch signals 850, 852, and 854 would not be a string of touch signals below dip threshold $T_3$ 846 because not all of them are below dip threshold $T_3$ 846. Also, touch signals 820, 830, and 852 would not form a string of touch signals below dip threshold $T_3$ 846 because the touch signals are not spatially adjacent to each other. In some cases, robustness may be added, wherein in certain circumstances, touch signals that are not spatially adjacent to other touch signals in the string and/or not below dip threshold $T_3$ 846 may nevertheless be considered part of the string. Such cases may be used to account for noise and/or other variations in the screen signal.

In some embodiments, two local maxima and a string of touch signals therebetween may be used to identify moisture. In the case of the graph of screen signal 844, the local maxima 814 and 834 has the string of touch signals 818, 820, 822, 824, 826, 828, 830, and 832 disposed therebetween, which is a string of touch signals below dip threshold $T_3$ 846. In this way, touch signals 814 and 834, and the touch signals between them, might be identified as being associated with moisture. As another example, touch signals 836 and 834, and the touch signals between them, may not be identified as part of a screen signal associated with moisture because touch signal 836 is above finger touch threshold $T_1$ 842 and might be identified as a touch signal associated with a finger touch. Similarly, touch signals 812 and 814, and the touch signals between them, would not be identified as a screen signal associated with moisture in some embodiments because touch signal 812 is below noise threshold $T_2$ 840.

In some other embodiments, the two-dimensional analysis may only look at one local maximum and whether that local maximum is in proximity to a string of touch signals below a dip threshold. For example, for the graph of screen signal 844, touch signal 834 might be detected as being associated with moisture because the string of touch signals 818, 820, 822, 824, 826, 828, 830, and 832 is in proximity to it and each of the touch signals in the string of touch signals is below dip threshold $T_3$ 846. Also, touch signal 834 is a local maximum above noise threshold $T_2$ 840 and below finger touch threshold $T_1$ 842.

In some embodiments, there is a threshold for the string length $T_{SL}$ used in identifying a dip region. $T_{SL}$ may be a value stored in memory. In other embodiments, it is dynamically calculated by a touch screen device. The length of a string of touch signals below dip threshold $T_3$ 846 is compared to the threshold for the string length $T_{SL}$ in order to detect moisture. For example if $T_{SL}$ were ten (10) touch signals, then the string of touch signals 818, 820, 822, 824, 826, 828, 830, and 832, which is a string of touch signals of length eight (8) touch signals, would not be identified as being part of a dip region. However, if the threshold for the string length $T_{SL}$ were five (5) touch signals, then the string of touch signals 818, 820, 822, 824, 826, 828, 830, and 832 would be identified as a string of sufficient size to be associated with a dip region because the string length of eight (8) touch signals is larger than the threshold for the string length $T_{SL}$ of five (5) touch signals. In contrast, whether string length $T_{SL}$ were five (5) or eight (8) touch signals, touch signals 860 and 862 may not be identified as part of a dip region in some embodiments because these touch signals only form a string of touch signals of length two (2) touch signals, even though both are below dip threshold $T_3$ 846.

The determination of whether or not a dip region is in proximity to any local maximum may be accomplished in a number of ways as well. For example, the proximity may be a defined proximity, such as a distance threshold or a measurement between a touch signal associated with a local maximum and a touch signal associated with a dip region. In some embodiments, a distance threshold $T_D$ may be used, wherein if the string of touch signals below a dip threshold $T_3$ has a touch signal that is within distance threshold $T_D$ from the local maximum (the local maximum being between finger touch threshold $T_1$ and noise threshold $T_2$), then moisture may be identified. $T_D$ may be a value stored in memory or it may be dynamically calculated by a touch screen device. For example, the distance threshold $T_D$ might be five (5) touch signals, and the threshold for string length $T_{SL}$ may also be five (5) touch signals as previously described. In this situation, returning to FIG. 8, moisture may be detected at touch signal 834 because touch signal 834 is a local maximum between finger threshold $T_1$ 842 and noise threshold $T_2$ 840, and the string of touch signals 818, 820, 822, 824, 826, 828, 830, and 832 has a length greater than $T_{SL}$=five (5) touch signals and has a touch signal (e.g., touch signal 832) within $T_D$=five (5) touch signals of touch signal 834.

In other embodiments, proximity is measured from a touch signal other than a local maximum. This takes into account variability in the approximate ring, donut, torus, and/or bowl shape that screen signals associated with moisture may take. For example, in some screen signals, the approximately ring-shaped structure of a screen signal associated with moisture may have one side of the heightened region of the ring be wider than another side. This occurrence may cause the dip region disposed within the ring to be farther away from any given local maximum identified in the wider side, than any given local maximum found in the less wide side. Such a disparity can be seen in the two-dimensional slice shown in the graph of screen signal 844. For example, touch signal 834 is a local maximum with adjacent touch signals 856 and 848 that are also above noise threshold $T_2$ 840 and below finger touch threshold $T_1$ 842. In contrast, touch signal 814 is a local maximum with only adjacent touch signal 858 that is above noise threshold $T_2$ 840 and below touch threshold $T_1$ 842. To account for these variations, in some embodiments, touch signals near local maxima are used to determine proximity to dip regions. In some embodiments, these touch signals near the local maxima are part of a string of touch signals, or sets of connected component (which will be discussed in further detail later), around the local maxima. In other embodiments, an intermediate touch signal between a local maximum and a touch signal in a dip region is used to determine proximity to the dip region.

In an example implementation that takes into account these variations, the touch signal 834, which is a local maximum, has other touch signals near it that are also above noise threshold $T_2$ 840 and below finger touch threshold $T_1$ 842. These touch signals are touch signals 856 and 848. In some embodiments, the distance between one of these touch signals near to the local maximum (but that is not a local maximum itself) and a touch signal in the string of touch signals below the dip threshold $T_3$ may be compared to the distance threshold $T_D$ to determine proximity. In some embodiments, the touch signal near to the local maxima is the touch signal that is spatially nearest to the string of touch signals below the dip threshold $T_3$. For example, the distance between the string of touch signals 818, 820, 822, 824, 826, 828, 830, and 832 and touch signal 856 is one (1) touch signal. This distance may be compared to the distance threshold $T_D$ to determine whether or not the dip region is in proximity to a local maximum (e.g., touch signal 834), which is used to detect moisture. As stated above, although this described example is in two-dimensions for illustrative purposes, it should be appreciated that the same analysis may be done in three-dimensions, where distance is measured in any number of planes.

In another example implementation, whether a dip region and a local maximum are in proximity is measured using the concavity of adjacent touch signals and/or points of inflection. Concavity may be determined by approximating a curve to the touch signals measured at each sensing node. An example of such a curve in two-dimensions is shown in the graph of screen signal 844 where a line is drawn between the touch signals. The curve may be approximated to the discrete points (e.g., the touch signals) using any known method in the art. If the curve is twice differentiable, the screen signal is concave up at touch signals where the second derivative is greater than zero. It is concave down where the second derivative is less than zero. An inflection point, which is where the curve switches concavity, is located where the second derivative is equal to zero. Concavity and/or an inflection point may also be approximated. Generally, a concave portion of a curve is rounded inward like the inside of a bowl. A convex portion of a curve is rounded like the exterior of a sphere or circle. The inflection point is the point (e.g., a touch signal or a place between touch signals) where a portion of the curve switches from being rounded inward like the inside of a bowl to rounded like the exterior of a sphere or circle, and/or vice versa.

There are a number of ways of approximating concavity and/or inflection points known in the art. In some embodiments, a local maximum between finger threshold $T_1$ 842 and noise threshold $T_2$ 840 is first located. An example of such a local maximum on the graph of screen signal 844 is touch signal 834. Touch signal 834 is on a concave down interval of the curve, as seen by its heightened position on a crest of the graph of screen signal 844. The concavity switches to concave up as the graph of screen signal 844 goes to the string of touch signals 818, 820, 824, 826, 828, 830 and 832, which is below dip threshold $T_3$ 846. In some embodiments, touch signal 856 would be identified as an inflection point, because it is approximately where the concavity switches between concave down and concave up. In other embodiments, the inflection point may be interpolated between touch signals 856 and 832. In either of these cases, or any case where an inflection point is identified, the spatial distance between the inflection point and the string of touch signals 818, 820, 822, 824, 826, 828, 830, and 832 could then be calculated to see if that distance is less than the distance threshold $T_D$. If the spatial distance is less than the distance threshold $T_D$, and the string of touch signals has length greater than $T_{SL}$, then moisture may be detected. Analogous measurements can be made in three-dimensions.

As will be appreciated by these examples, any number of ways may be used to measure the proximity between a dip region below dip threshold $T_3$ and a local maximum that is between finger touch threshold $T_1$ and a noise threshold $T_2$. These ways may involve using the local maximum itself as part of the calculation, a touch signal spatially near to the local maximum, and/or an intermediary point (e.g., a touch signal) between the local maximum and a touch signal in the dip region.

Figure 9:
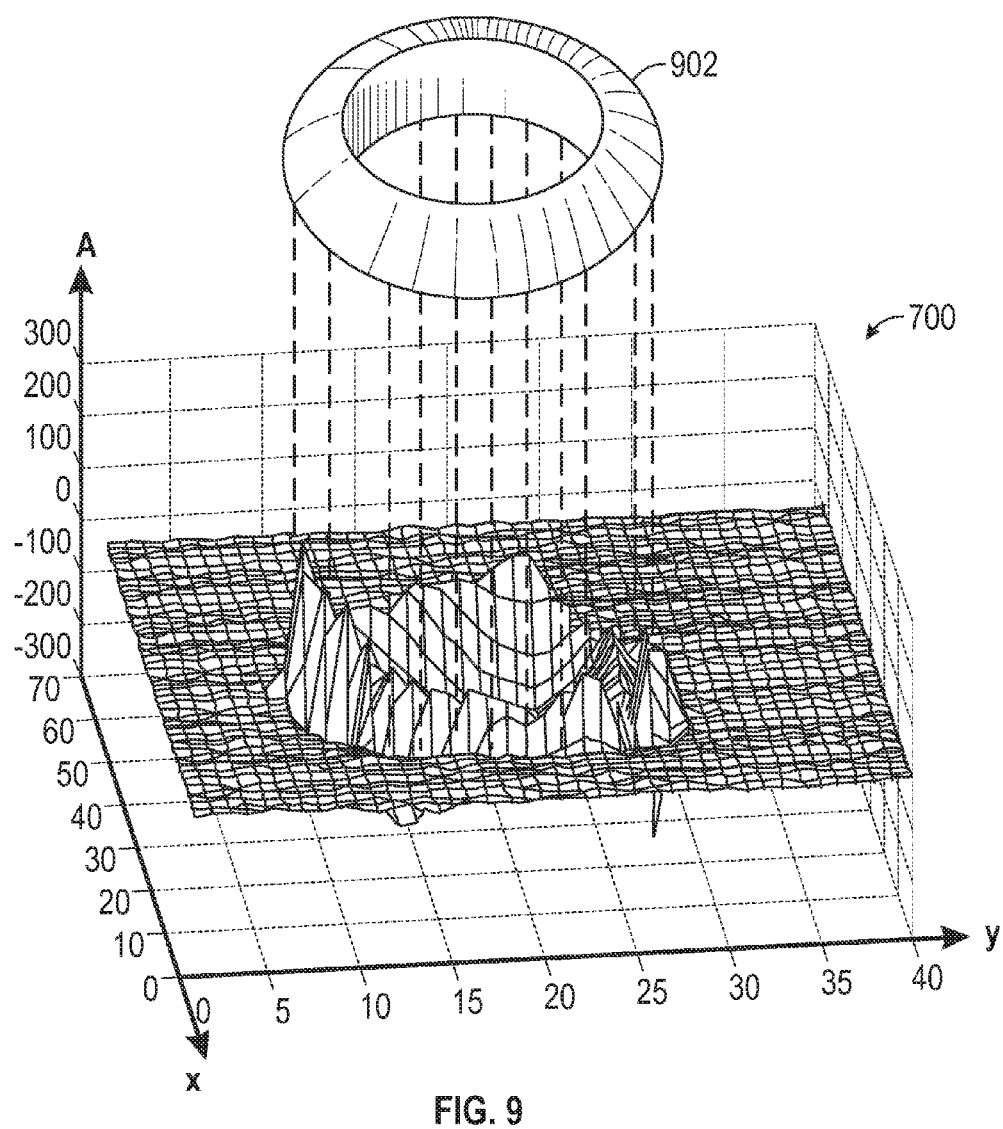
FIG. 9 illustrates an example of the approximate ring shape of a graph of a screen signal generated from a moisture drop touch in an instance of time.

FIG. 9 illustrates an example of the approximate ring shape of a graph of a screen signal generated from a moisture drop touch in an instance of time. It shows the approximate representative shape of screen signal 700 of FIGS. 7A and 7B. The ring structure 902 shows that screen signal 700 has touch signals with greater amplitudes around the edges and a dip region in the middle. Ring structure 902 illustrates the heightened touch signals around a dip region, however, the visual representation of ring structure 902 should be understood to be approximate. The heightened edges are a collection of touch signals of different amplitudes, and often do not form a perfect ring shape. Aside from height variability, the ring shape may not be perfectly circular, and can have inward or outward extensions and/or disparities in size or shape between different portions of the screen signal 700.

Figure 10:
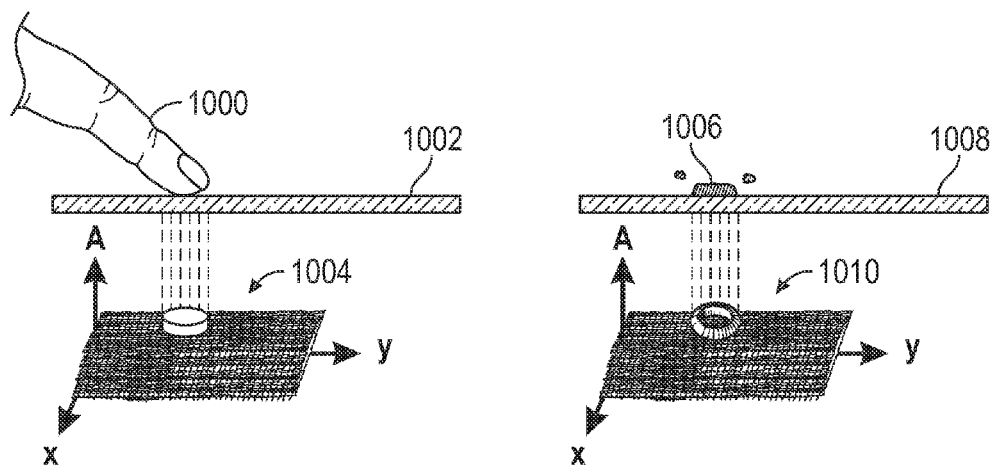
FIG. 10 is an example illustrating the approximate shape of the screen signal associated with a finger touch and a moisture drop touch on example touch screen devices.

FIG. 10 is an example illustrating the approximate shapes of the screen signals associated with a finger touch and a moisture drop touch on example touch screen devices. When finger 1000 touches touch screen device 1002, screen signal 1004 has an approximately cylindrical and/or disk shape. In contrast, when moisture drop 1006 contacts touch screen device 1008, the screen signal 1010 is approximately bowl, donut, torus and/or ring shaped.

Figure 11:
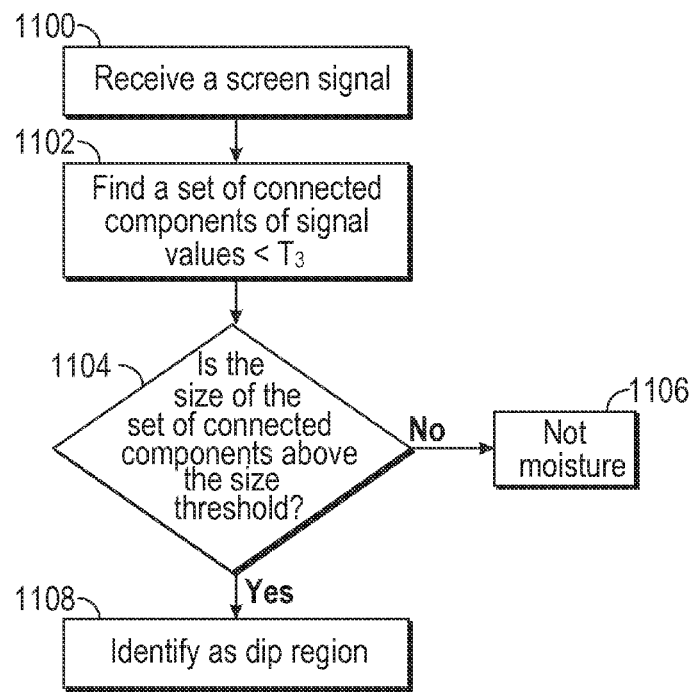
FIG. 11 is an example flowchart diagram of a method to identify a dip region in a screen signal.

FIG. 11 is an example flowchart diagram of a method to identify a dip region in a screen signal. In block 1100, a screen signal is received. In some embodiments, this screen signal may be three-dimensional, such as screen signal 700. The screen signal may also be represented as a matrix of touch signals, wherein each entry of the matrix is the amplitude of the touch signal measured at a sensing node of the touch screen device.

Block 1102 finds a set of connected components in the screen signal where each of the touch signals of each connected component is less than dip threshold $T_3$. In some embodiments, finding a set of connected components involves creating a matrix where the entries correspond to the touch signal measured at each sensing node of the touch screen device. The processor assigns a "1" to the entries of the matrix that correspond to each of the touch signals with amplitudes less than dip threshold $T_3$, and a "0" to the other entries of the matrix (e.g., entries that correspond to sensing nodes with touch signals with amplitudes greater than or equal to dip threshold $T_3$). Because the entries of this matrix are either "1" or "0," some in the art call this matrix a "binary image."

In some embodiments, a set of connected components is a set S of touch signals, where each touch signal corresponds to a "1" in the aforementioned matrix, and where for every pair of touch signals in S with corresponding sensing nodes $s_1$ and $s_2$, there exists a sequence of sensing nodes, $s_i, \ldots, s_j$, such that all sensing nodes in the sequence correspond with a touch signal in set S, and every two sensing nodes that are adjacent in the sequence of sensing nodes are neighbors. "Neighbors" can have different meanings depending on whether a 4-connected component analysis or an 8-connected component analysis is performed.

Figure 12:
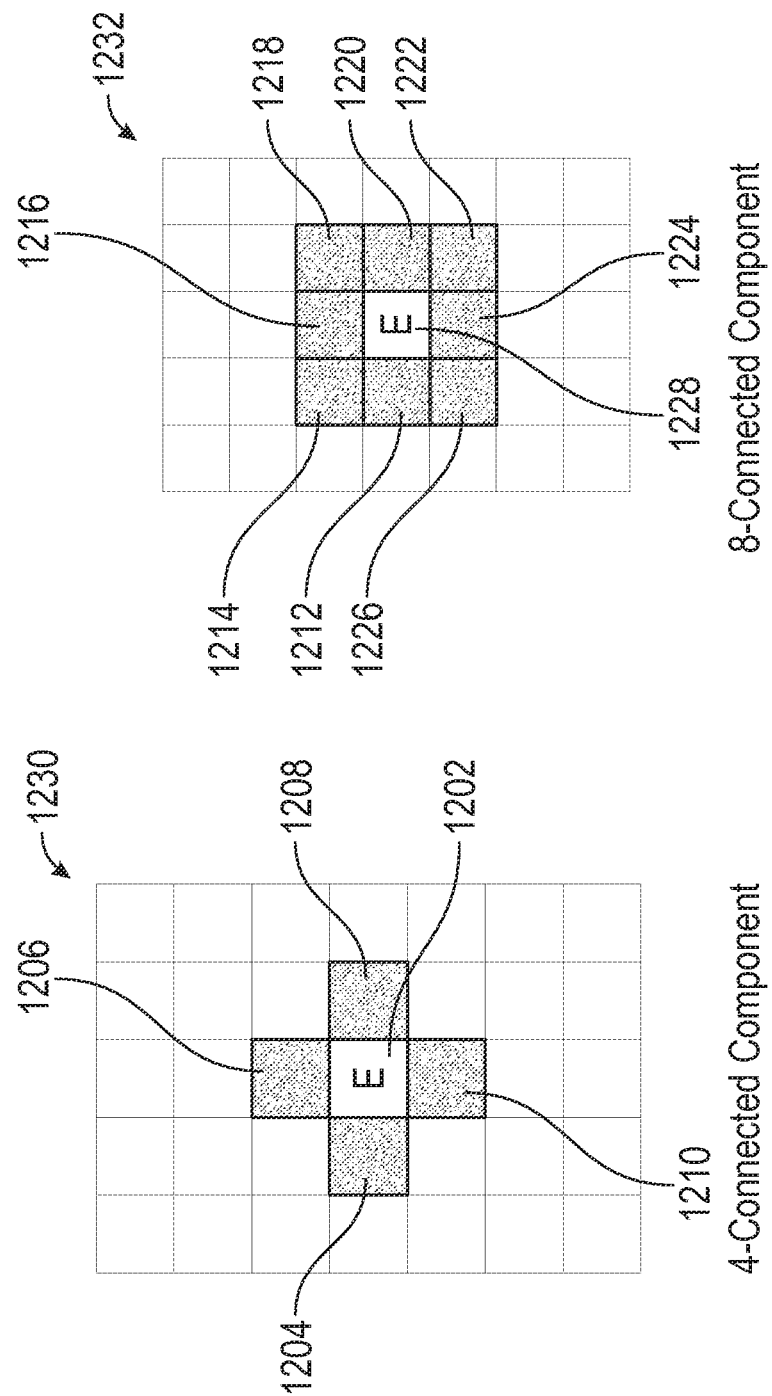
FIG. 12 shows an example 4-connected component analysis and an example 8-connected component analysis.

FIG. 12 shows an example 4-connected component analysis and an example 8 connected component analysis. In these examples, each entry (e.g., entry 1206) of matrices 1230 and 1232 corresponds to a sensing node on a touch screen device. The entries of matrices 1230 and 1232 are organized such that entries that are adjacent in the matrices 1230 and 1232 correspond to sensing nodes that are adjacent on the touch screen device. In a 4-connected component analysis, entry 1202 is neighbors with four entries 1204, 1206, 1208, and 1210, in which the entry 1202 shares an edge. In an 8-connected component analysis, entry 1228 is neighbors with eight entries 1212, 1214, 1216, 1218, 1220, 1222, 1224, and 1226, in which entry 1228 shares an edge or a corner.

As applied in block 1102 of FIG. 11, either a 4-connected component or an 8-connected component analysis performed on the aforementioned matrix would identify a set of connected components of the screen signal where each sensing node within the set of connected components has a touch signal with an amplitude less than the dip threshold $T_3$. A certain level of robustness may also be introduced in certain embodiments, where sensing nodes that do not have touch signals with amplitudes less than the dip threshold $T_3$ may nevertheless be included in a set of connected components. This inclusion may account for noise or other variations in the signal.

One of ordinary skill in the art should also recognize that other methods of finding a set of connected components could be used instead of the aforementioned matrix. For example, in embodiments where the signal has been offset such that touch signals below dip threshold $T_3$ are negative, a connected component analysis can be applied to the negative amplitudes.

Continuing in FIG. 11, block 1104 determines if the size of the set of connected components found in block 1102 is above the size threshold. If the size of the set of connected components is not above the size threshold, the set of connected components is not part of a signal associated with moisture, as shown in block 1106. In some embodiments, the size threshold is a value stored in memory. In other embodiments, it is dynamically calculated by the touch screen device.

If the size of the set of connected components is above the size threshold, then block 1108 identifies the connected components as a dip region, which can be part of a screen signal associated with moisture in some embodiments.

In some embodiments, there is further a maximum size threshold, wherein if the size of the set of connected components is above the maximum size threshold, then the connected component is not identified as a dip region.

Block 1102 and subsequent blocks of FIG. 11 may be repeated in some embodiments to find and evaluate each set of connected components of a screen signal.

Figure 13:
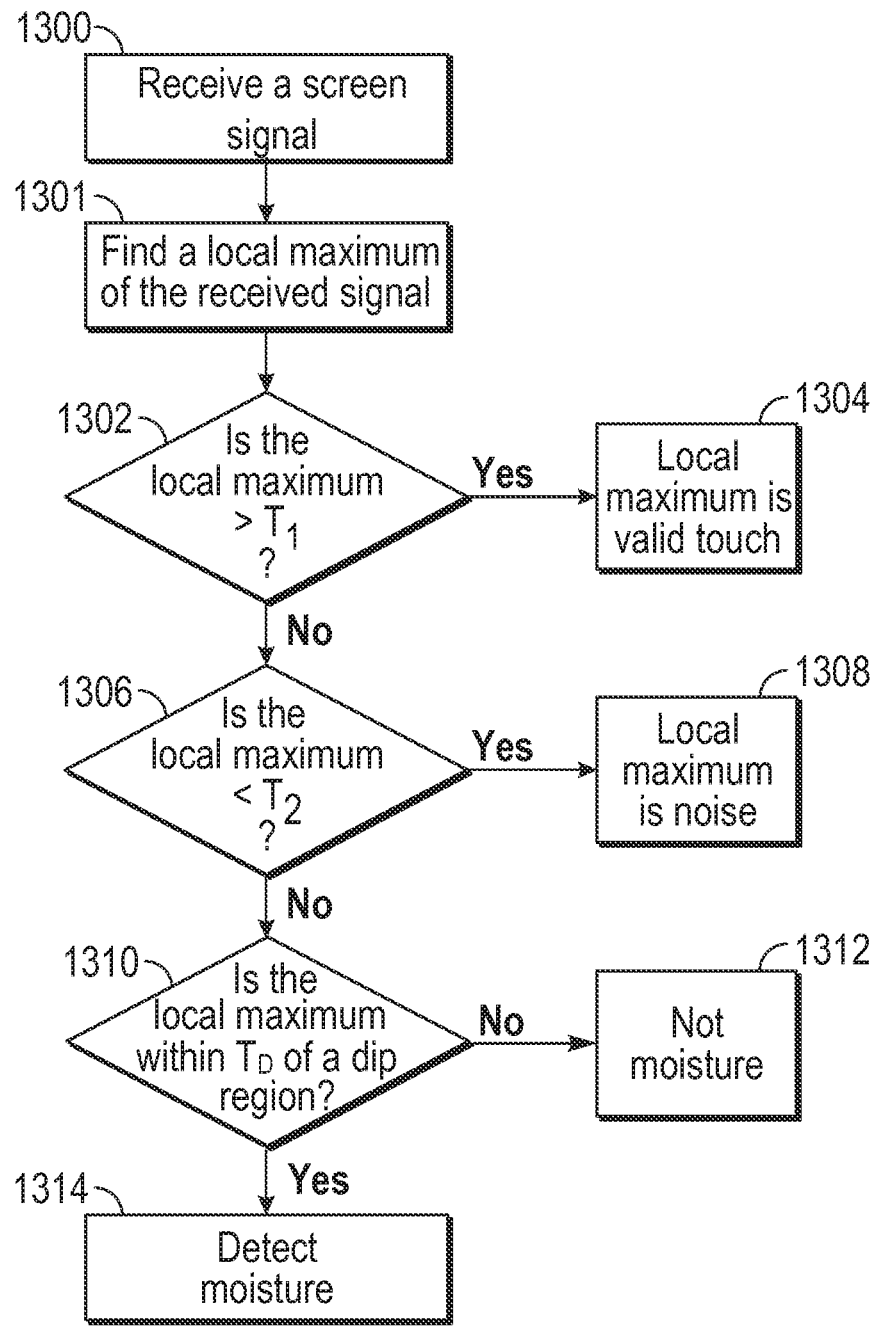
FIG. 13 is a flowchart diagram of a method according to an example embodiment.

FIG. 13 is a flowchart diagram of a method according to an example embodiment. A screen signal is received in block 1300. Block 1301 finds a local maximum of the screen signal received in block 1300. By way of illustration, some examples of local maxima are touch signals 704, 706, and 720 in screen signal 700 of FIG. 7A.

There are also numerous image segmentation techniques known in the art that could be implemented to locate each local maximum. These techniques include watershed techniques, k-means clustering, region-growing, and various other techniques.

Continuing in FIG. 13, in block 1302, if the local maximum is greater than finger touch threshold $T_1$, then the local maximum is identified as a valid touch (e.g., a finger touch) in block 1304. Touch signal 836 is an illustrative example of such a local maximum in FIG. 8.

However, if the local maximum is not greater than finger touch threshold $T_1$, then block 1306 further evaluates if the local maximum is less than noise threshold $T_2$. If the local maximum is less than noise threshold $T_2$, then block 1308 identifies the local maximum as noise. By illustrative example, touch signals 810 and 812 would be such local maxima in FIG. 8.

If the result of block 1306 is that the local maximum is not less than noise threshold $T_2$, then the local maximum has been determined to fall in the range between finger touch threshold $T_1$ and noise threshold $T_2$.

Block 1310 then determines if the local maximum is within a threshold distance $T_D$ of a dip region, where the dip region may be identified using the method of FIG. 11 applied to the received signal in block 1300. In some embodiments, the threshold distance $T_D$ is a value stored in memory. In other embodiments, it is dynamically calculated by a touch screen device. As previously described, points (e.g., touch signals) other than the local maximum may be used to determine if the local maximum is within a threshold distance $T_D$ from a dip region. For example, a connected component analysis may be performed on the touch signals between finger touch threshold $T_1$ and noise threshold $T_2$ to find a set of connected components. Any touch signal in this set of connected components might be used to measure the distance to a touch signal in the dip region, and that measurement may be compared to the threshold distance $T_D$. As also described previously, the concavity and/or inflection points of the graph of a screen signal may also be used in measuring distance, as well as any other intermediary touch signals between a local maximum and a touch signal in the dip region.

In some embodiments, the method of FIG. 11 may be applied independently to the received screen signal in block 1300. In other embodiments, block 1310 looks for whether the received screen signal in block 1300 contains touch signals less than dip threshold $T_3$. If one such touch signal is found, then a set of connected components can be grown from that one touch signal, wherein the set of connected components expands to include other touch signals less than dip threshold $T_3$ using a connected component analysis. If this set of connected components is greater in size than a threshold size, then the set of connected components is found to be a dip region.

Continuing in FIG. 13, if the local maximum is not within the threshold distance $T_D$ of a dip region, then block 1312 finds that the local maximum is not associated with moisture. Otherwise, block 1314 detects moisture.

In another embodiment, another method to detect moisture is used. In this method, the approximate bowl, torus, donut and/or ring shape of a screen signal associated with moisture is detected. Due to the varying amplitudes of touch signals around the edges of a moisture drop, the bowl, torus, donut and/or ring shape can be broken into several smaller sets of connected components. For example, in some embodiments, a 4-connected component analysis can be used to detect the shape. In other embodiments, an 8-connected component analysis can be used instead of a 4-connected component analysis to detect the shape. Image processing techniques such as morphology can also be used to improve detection.

Once the approximate bowl, torus, donut, and/or ring shape is detected, another connected component analysis can be used to check if a dip region exists inside the shape. The presence of such a dip region suggests that the screen signal is associated with moisture. If that analysis indicates the presence of moisture, the location of that moisture on the touch screen device is also known because the location of the bowl, torus, donut, and/or ring shape of the edges of the moisture drop is known.

Figure 14:
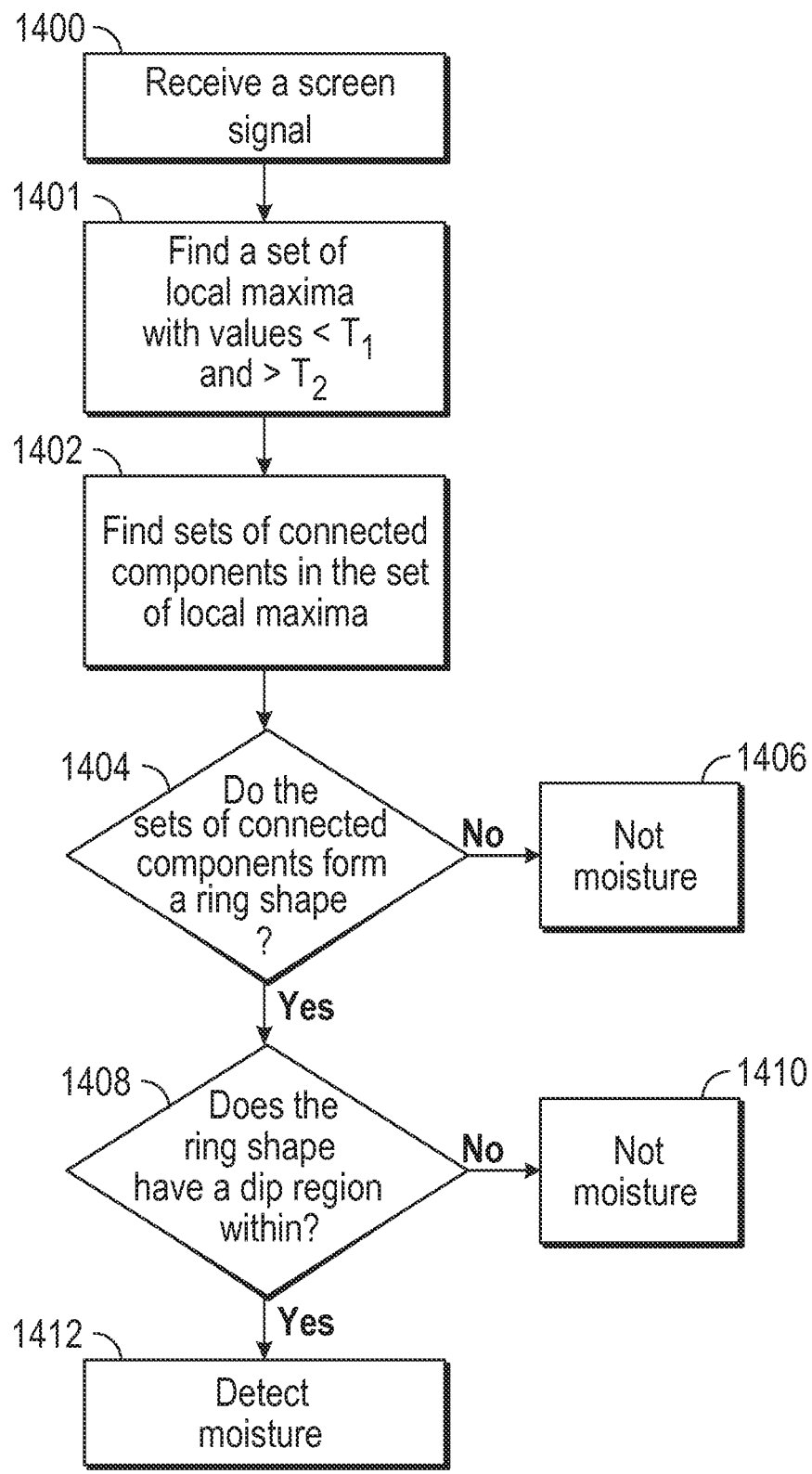
FIG. 14 is a flowchart diagram of another method according to an example embodiment.

FIG. 14 is a flowchart diagram of another method according to an example embodiment. In block 1400, a screen signal is received. In block 1401, a set of local maxima with touch signal amplitudes that are less than finger touch threshold $T_1$ and greater than noise threshold $T_2$ is found. This set of local maxima can be found using any of the methods aforementioned, as well as any way known in the art.

Block 1402 finds sets of connected components in the set of local maxima. In some embodiments, block 1402 involves creating a matrix where the entries correspond to the touch signal measured at each sensing node of the touch screen device. The processor assigns a "1" to the entries of the matrix that correspond to each of the touch signals that are local maxima greater than noise threshold $T_2$ and less than finger touch threshold $T_1$, and a "0" to the other entries of the matrix. In these embodiments, a connected component analysis as previously described in this disclosure would be performed on the matrix to find sets of connected components. Either a 4-component or an 8-component analysis could be used to find these sets of connected components.

Again, in other implementations, other methods known in the art may be used instead of the aforementioned matrix. For example, block 1402 could alternatively identify touch signals with amplitudes between noise threshold $T_2$ and finger touch threshold $T_1$ using any known methods in the art. Once the location of those touch signals has been identified, a processor can evaluate if those touch signals form an approximate bowl, torus, donut, and/or ring shape.

Figure 15:
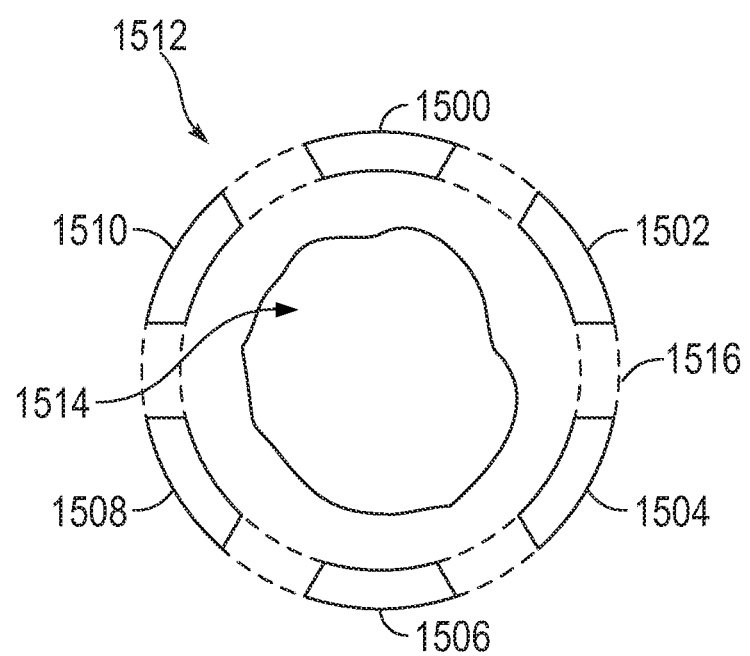
FIG. 15 is an example illustration showing the approximate shape of a screen signal associated with moisture, wherein local maxima form an approximately ring-shaped structure with a dip region in the middle.

Block 1404 examines whether sets of connected components form a ring shape (or a bowl, donut, or any other shape associated with moisture discussed in this disclosure). FIG. 15 illustrates this concept. FIG. 15 is an example illustration showing the approximate shape of a screen signal associated with moisture, wherein local maxima form an approximately ring-shaped structure with a dip region in the middle. Approximate screen signal shape 1512 outlines the approximate shape formed by sets of connected components found in a screen signal associated with moisture. The illustration shows sets of connected components 1500, 1502, 1504, 1506, 1508, and 1510 of local maxima less than finger touch threshold $T_1$ and greater than noise threshold $T_2$. These sets of connected components approximately form a ring shape, as seen by the dotted lines in the figure. There may be portions in the approximate ring shape of signal shape 1512, such as component 1516, that are not sets of connected components of local maxima less than finger threshold $T_1$ and greater than noise threshold $T_2$ The shape of the ring may be also not perfectly circular. Again, in many embodiments, the sets of connected components may not line up in an exact ring shape; rather, they form an approximate ring shape where there can be deviations from the precise circular shape of a ring.

In some embodiments, a comparison between an approximate shape and a screen signal may involve calculating a percentage of overlap between sets of connected components of the screen signal and a three-dimensional ring shape having the approximate dimensions of a screen signal associated with a moisture touch. In some embodiments, the three-dimensional ring shape may be seeded and grown from within the sets of connected components of the screen signal. In other embodiments, a large ring shape may be shrunk to approximate the shape of the sets of connected components of the screen signal. In some embodiments, three-dimensional ring shapes of various sizes may be compared to the sets of connected components. Also, in other embodiments, other three-dimensional shapes may be used for comparison, such as a torus, donut, bowl, and or any shape where the sides are raised and the middle is a dip region.

Continuing in FIG. 14, if in block 1404, the sets of connected components are found to not form an approximate ring shape (or a bowl, donut, or any other shape associated with moisture discussed in this disclosure), then block 1406 finds that the received screen signal is not associated with moisture. If the connected components do form an approximate ring shape (or a bowl, donut, or any other shape associated with moisture discussed in this disclosure), block 1408 examines whether the ring shape formed by the sets of connected components of local maxima has a dip region disposed within it.

Returning back to FIG. 15, an example of a dip region is shown by approximate screen signal shape 1514. Such a dip region can, in some embodiments, be found using the method illustrated in FIG. 11. In other embodiments, the approximate screen signal shape 1514 can be found using morphological or image processing techniques. It should be appreciated that in this disclosure, whether in two dimensions or in three dimensions, the sensing nodes in a dip region have touch signal amplitudes that are less than dip threshold $T_3$. In many cases, each sensing node in the dip region is adjacent to at least one other sensing node in the dip region.

If there is no dip region within the ring-shaped (or any other shape mentioned in this disclosure) sets of connected components of local maxima, then block 1410 finds the received screen signal from block 1400 does not have a screen signal associated with moisture. If there is a dip region within, then block 1412 detects moisture.

Figure 16:
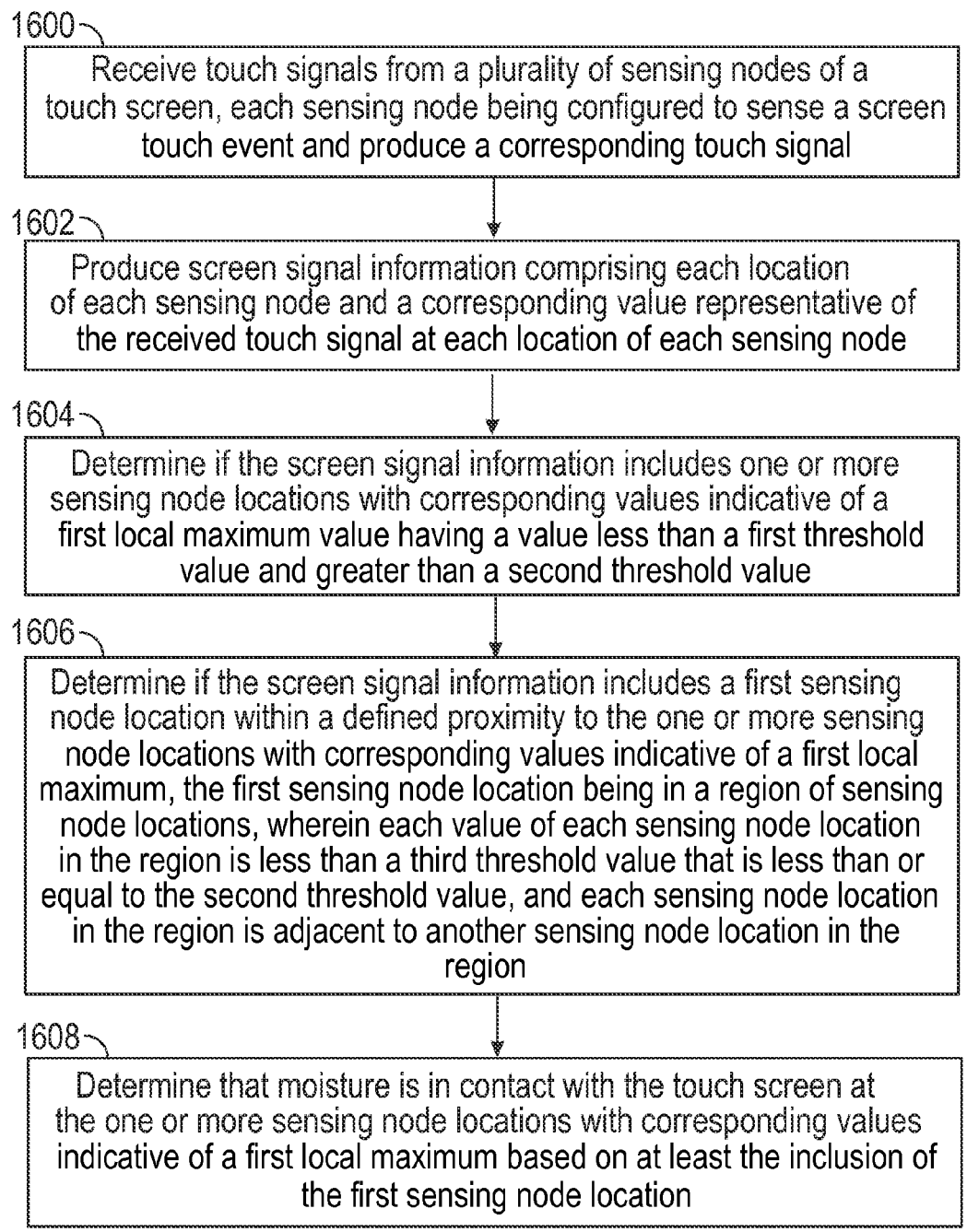
FIG. 16 is a flow diagram of a method according to an example embodiment.

FIG. 16 is a flow diagram of a method according to an example embodiment. In block 1600, the method receives touch signals from a plurality of sensing nodes of a touch screen, each sensing node being configured to sense a screen touch event and produce a corresponding touch signal. In block 1602, the method produces screen signal information comprising each location of each sensing node and a corresponding value representative of the received touch signal at each location of each sensing node. In block 1604, the method determines if the screen signal information includes one or more sensing node locations with corresponding values indicative of a first local maximum value having a value less than a first threshold value and greater than a second threshold value. In block 1606, the method determines if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region. And in block 1608, the method determines that moisture is in contact with the touch screen at the one or more sensing node locations with corresponding values indicative of a first local maximum based on at least the inclusion of the first sensing node location.

In other embodiments, morphological image processing is used to identify whether a screen signal is associated with moisture by the shape of the screen signal. These embodiments can search the screen signal, such screen signal 700, and look for the approximate ring shape and dip region (or any of the other shapes mentioned in this disclosure) associated with moisture.

In alternative embodiments, other shapes, such as funnels, cone, three-dimensional logarithmic curves, etc., may be used to detect moisture in any of the embodiments aforementioned.

In addition, other embodiments contemplate using other image processing techniques including watershed techniques, k-means clustering, region-growing, and various other techniques, to detect the approximate ring shape and dip region (or any of the other shapes mentioned in this disclosure) associated with moisture.

A person/one having ordinary skill in the art would understand that information and signals (e.g., screen signals or touch signals) may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps or blocks described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps or blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps or blocks of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps or blocks in any disclosed process is an example of a sample approach. Based upon design preferences, it is understood that the specific order or hierarchy of steps or blocks in the processes may be rearranged while remaining within the scope of the present disclosure. The accompanying method claims present elements of the various steps or blocks in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A touch screen apparatus, comprising:
   a touch screen having a plurality of sensing nodes, each sensing node being configured to sense a screen touch event and produce a corresponding touch signal;
   a sensing circuit configured to receive touch signals from the plurality of sensing nodes and to produce a screen signal comprising each location of each sensing node and a corresponding value representative of the received touch signal at each location of each sensing node;
   a memory component in communication with the sensing circuit, the memory component configured to store screen signal information; and
   a processor in communication with the memory component, the processor configured to:
      retrieve screen signal information from the memory component,
      determine if the screen signal information includes one or more sensing node locations with corresponding values indicative of a first local maximum value having a value less than a first threshold value and greater than a second threshold value,
      determine if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region, and
      determine that moisture is in contact with the touch screen at the one or more sensing node locations with corresponding values indicative of a first local maximum based on at least the inclusion of the first sensing node location.

2. The apparatus of claim 1, wherein the defined proximity is based on at least a distance threshold.

3. The apparatus of claim 1, wherein the processor is further configured to determine that moisture is in contact with the touch screen at sensing node locations associated with the region based on at least the inclusion of the first sensing node location.

4. The apparatus of claim 1, wherein the first threshold is less than a lowest value associated with a finger touch for the screen signal information.

5. The apparatus of claim 1, wherein the second threshold signal value is greater than a highest value associated with noise for the screen signal information.

6. The apparatus of claim 1, wherein the processor is further configured to determine if the screen signal information includes one or more sensing node locations with corresponding values indicative of a second local maximum value, the second local maximum value being less than the first threshold value and greater than the second threshold value.

7. The apparatus of claim 6, wherein the processor is further configured to determine if the screen signal information includes a second sensing node location within the defined proximity to the one or more sensing node locations with corresponding values indicative of a second local maximum, the second sensing node location being in the region.

8. The apparatus of claim 7, wherein the determination that moisture is in contact with the touch screen at the one or more sensing node locations with corresponding values indicative of a first local maximum is further based on at least the inclusion of the second sensing node location.

9. A moisture detection method, comprising:
   receiving touch signals from a plurality of sensing nodes of a touch screen, each sensing node being configured to sense a screen touch event and produce a corresponding touch signal;
   producing screen signal information comprising each location of each sensing node and a corresponding value representative of the received touch signal at each location of each sensing node;
   determining if the screen signal information includes one or more sensing node locations with corresponding values indicative of a first local maximum value having a value less than a first threshold value and greater than a second threshold value;
   determining if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region; and
   determining that moisture is in contact with the touch screen at the one or more sensing node locations with corresponding values indicative of a first local maximum based on at least the inclusion of the first sensing node location.

10. The method of claim 9, wherein the defined proximity is based on at least a distance threshold.

11. The method of claim 9, further comprising determining that moisture is in contact with the touch screen at sensing node locations associated with the region based on at least the inclusion of the first sensing node location.

12. The method of claim 9, wherein the first threshold is less than a lowest value associated with a finger touch for the screen signal information.

13. The method of claim 9, wherein the second threshold signal value is greater than a highest value associated with noise for the screen signal information.

14. The method of claim 9, further comprising determining if the screen signal information includes one or more sensing node locations with corresponding values indicative of a second local maximum value, the second local maximum value being less than the first threshold value and greater than the second threshold value.

15. The method of claim 14, further comprising determining if the screen signal information includes a second sensing node location within the defined proximity to the one or more sensing node locations with corresponding values indicative of a second local maximum, the second sensing node location being in the region.

16. The method of claim 15, wherein determining that moisture is in contact with the touch screen at the one or more sensing node locations with corresponding values indicative of a first local maximum is further based on at least the inclusion of the second sensing node location.

17. A touch screen apparatus, comprising:
means for receiving touch signals from a plurality of sensing nodes of a touch screen, each sensing node being configured to sense a screen touch event and produce a corresponding touch signal;
means for producing screen signal information comprising each location of each sensing node and a corresponding value representative of the received touch signal at each location of each sensing node;
means for determining if the screen signal information includes one or more sensing node locations with corresponding values indicative of a first local maximum value having a value less than a first threshold value and greater than a second threshold value;
means for determining if the screen signal information includes a first sensing node location within a defined proximity to the one or more sensing node locations with corresponding values indicative of a first local maximum, the first sensing node location being in a region of sensing node locations, wherein each value of each sensing node location in the region is less than a third threshold value that is less than or equal to the second threshold value, and each sensing node location in the region is adjacent to another sensing node location in the region; and
means for determining that moisture is in contact with the touch screen at the one or more sensing node locations with corresponding values indicative of a first local maximum based on at least the inclusion of the first sensing node location.

18. The apparatus of claim 17, wherein the defined proximity is based on at least a distance threshold.

19. The apparatus of claim 17, further comprising means for determining that moisture is in contact with the touch screen at sensing node locations associated with the region based on at least the inclusion of the first sensing node location.

20. The apparatus of claim 17, wherein the first threshold is less than a lowest value associated with a finger touch for the screen signal information.

21. The apparatus of claim 17, wherein the second threshold signal value is greater than a highest value associated with noise for the screen signal information.

22. The apparatus of claim 17, further comprising means for determining if the screen signal information includes one or more sensing node locations with corresponding values indicative of a second local maximum value, the second local maximum value being less than the first threshold value and greater than the second threshold value.

23. The apparatus of claim 22, further comprising means for determining if the screen signal information includes a second sensing node location within the defined proximity to the one or more sensing node locations with corresponding values indicative of a second local maximum, the second sensing node location being in the region.

24. The apparatus of claim 23, wherein determining that moisture is in contact with the touch screen at the one or more sensing node locations with corresponding values indicative of a first local maximum is further based on at least the inclusion of the second sensing node location.

25. A moisture detection method, comprising:
receiving touch signals from a plurality of sensing nodes of a touch screen, each sensing node being configured to sense a screen touch event and produce a corresponding signal;
producing screen signal information comprising each location of each sensing node and a corresponding value representative of the received signal at each location of each sensing node;
determining if the screen signal information includes one or more sensing node locations with corresponding values indicative of local maxima values having a value less than a first threshold value and greater than a second threshold value; and
determining that moisture is in contact with the touch screen based on at least a comparison between the one or more sensing node locations with corresponding values indicative of local maxima values and one or more three-dimensional shapes.

26. The method of claim 25, wherein the one or more three-dimensional shapes are at least one of a ring, donut, torus, cylinder, funnel, three dimensional logarithmic curve, and disk.

27. The method of claim 25, wherein the comparison comprises performing a connected component analysis on the one or more sensing node locations with values indicative of local maxima values.

28. The method of claim 25, wherein the first threshold is less than a lowest value associated with a finger touch for the screen signal information.

29. The method of claim 25, further comprising determining if the screen signal information includes one or more sensing node locations being in a region of sensing node locations, wherein each value of each sensing node location in the region is less than a third threshold value that is less than or equal to the second threshold value, and each sensing node location in the region is adjacent to another sensing node location in the region.

30. The method of claim 29, wherein determining that moisture is in contact with the touch screen is further based on if the region is disposed within the one or more three-dimensional shapes.

* * * * *